United States Patent [19]  
Niedrach et al.

[11] 3,923,626  
[45] Dec. 2, 1975

[54] MINIATURE PROBE CONTAINING MULTIFUNCTIONAL ELECTROCHEMICAL SENSING ELECTRODES

[75] Inventors: Leonard W. Niedrach; William H. Stoddard, Jr., both of Schenectady, N.Y.

[73] Assignee: General Electric Company, Schenectady, N.Y.

[22] Filed: Nov. 1, 1974

[21] Appl. No.: 519,794

[52] U.S. Cl. ........... 204/195 R; 128/2 E; 204/195 P
[51] Int. Cl.² .................. G01N 27/30; G01N 27/46
[58] Field of Search ............ 204/195 R, 195 P, 1 T, 204/195 M; 128/2 E, 2.1 E; 324/29

[56] References Cited
UNITED STATES PATENTS

| | | | |
|---|---|---|---|
| 3,671,414 | 6/1972 | Grubb | 204/195 R |
| 3,705,088 | 12/1972 | Niedrach et al. | 204/195 P |
| 3,709,810 | 1/1973 | Grubb et al. | 204/195 R |
| 3,709,812 | 1/1973 | Niedrach et al. | 204/195 P |
| 3,714,015 | 1/1973 | Niedrach | 204/195 P |
| 3,719,575 | 3/1973 | Niedrach et al. | 204/195 P |
| 3,719,576 | 3/1973 | Macur | 204/195 P |
| 3,730,868 | 5/1973 | Niedrach | 204/195 P |
| 3,794,575 | 2/1974 | Niedrach et al. | 204/195 P |
| 3,835,013 | 9/1974 | Grubb et al. | 204/195 R |
| 3,839,178 | 10/1974 | Macur | 204/195 P |

*Primary Examiner*—G. L. Kaplan  
*Attorney, Agent, or Firm*—Charles T. Watts; Joseph T. Cohen; Jerome C. Squillaro

[57] ABSTRACT

A miniature probe contains multifunctional electrochemical electrodes which measure oxygen content or the hydrogen ion activity or pH of samples. One of these electrodes is contained within an oxygen sensor, one of these electrodes is contained within a carbon dioxide sensor while the other electrode can be coupled with a separate reference electrode or the reference electrode can surround the probe thereby providing a hydrogen ion activity or pH sensor. In this manner, the miniature probe contains an oxygen sensor, a carbon dioxide sensor and a pH electrode, or an oxygen sensor, a carbon dioxide sensor and a pH sensor.

7 Claims, 1 Drawing Figure

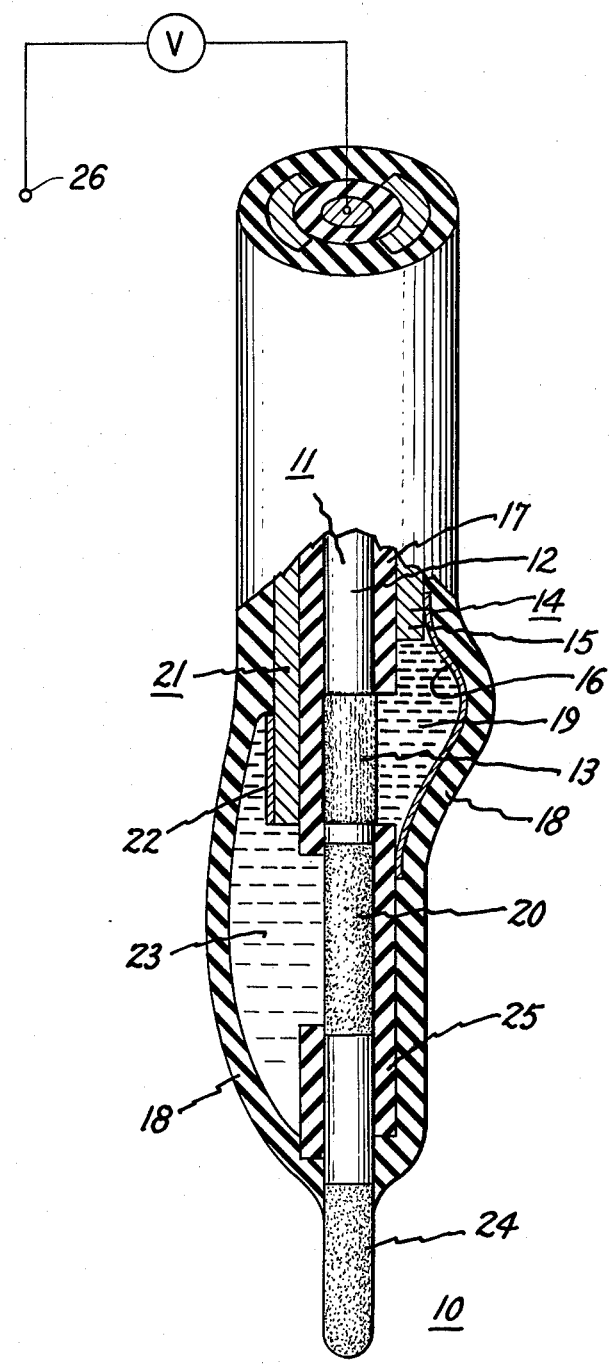

MINIATURE PROBE CONTAINING MULTIFUNCTIONAL ELECTROCHEMICAL SENSING ELECTRODES

This invention relates to a miniature probe containing multifunctional electrochemical sensing electrodes and, more particularly, to such a miniature probe containing an oxygen sensor, a carbon dioxide sensor and a pH electrode, or containing an oxygen sensor, a carbon dioxide sensor and a pH sensor.

Cross-references are made to the following patent applications: Ser. No. 519,273 filed concurrently herewith which application is entitled "Miniature Probe Having Multifunctional Electrodes for Sensing Ions and Gases" in the namer of Robert A. Macur; Ser. No. 519,797 filed concurently herewith which application is entitled "Miniature Probe Containing Multifunctional Electrochemiical Sensing Electrodes" in the names of Leonard W. Niedrach and William H. Stoddard, Jr.; Ser. No. 519,795 filed concurrently herewith which application is entitled "Miniature Probe Containing Multifunctional Electrochemical Sensing Electrodes" in the names of Leonard W. Niedrach and William H. Stoddard, Jr.; Ser. No. 519,798 filed concurrently herewith which application is entitled "Miniature Probe Containing Multifunctional Electrochemical Electrodes" in the name of John F. Brown, Jr.; and Ser. No. 519,798 filed conncurrently herewith which application is entitled "Miniature Multifunctional Electrochemical Sensor For Simultaneous Carbon Dioxide and pH Measurements" in the names of Oliver H. LeBlanc, Jr., Willard T. Grubb, and Rober A. Macur.

The above five cross-referenced patent applications are assigned to the same assignee as the present application.

Sensors are employed to determine the content of a specific substance in a fluid or atmosphere. For example, a sensor might be employed to determine the content of oxygen or carbon dioxide in a sample, or its content of hydrogen ions or other ions in solution.

Oxygen, pH and carbon dioxide sensors are known respectively, in the prior art for measuring the oxygen content of a sample, the hydrogen ion activity or pH of a sample, or for measuring the carbon dioxide content of a sample. An oxygen sensor is described and claimed in U.S. Pat. No. 3,714,015. A hydrogen ion or pH sensor is described and claimed in U.S. Pat. Nos. 3,671,414, 3,709,810 and 3,719,576. Carbon dioxide sensors are described in U.S. Pat. Nos. 3,673,069, 3,705,088, 3,709,812 and 3,719,576. Methods of manufacturing sensors by successive layers are described in U.S. Pat. No. 3,798,750. All of the above patents are assigned to the same assignee as the present application.

Our present invention is directed to an improved miniaturized multifunctional probe which is suitable for biomedical, environmental control and other applications which probe can be used in vivo or in vitro analyses.

The primary objects of our invention are to provide a rugged, accurate and miniaturized multifunctional probe for oxygen, pH and carbon dioxide measurements.

In accordance with one aspect of our invention, a miniature probe contains an oxygen sensor, a carbon dioxide sensor and a pH electrode, or an oxygen sensor, a carbon dioxide sensor and a pH sensor.

These and various other objects, features and advantages of the invention will be better understood from the following description taken in connection with the accompanying drawing in which:

The single FIG. is a partial sectional view of a miniature probe containing an oxygen sensor, a $CO_2$ sensor and a pH electrode made in accordance with our invention.

In the single FIGURE of the drawing there is shown generally at 10 a miniature multifunctional probe comprising an oxygen sensor, a carbon dioxide sensor and a pH electrode made in accordance with our invenion. The oxygen sensor is shown in the form of flexible, elongated electrode lead 11 which has a base member and an exterior surface 12 of palladium metal on the base member. An electrochemically active region 13 adheres tightly to and is in electrical contact with at least a portion of the metal surfaced base member 12 of the oxygen ion-selective electrode 11. Electrochemically active region 13, which forms the first electrode, is hybrided palladium with a surface coating of platinum black. A second electrode 14 surrounds at least partially and is spaced from the metal surfaced base member of the electrode lead 11. Second electrode 14 contains a metal lead or current collector 15 and a second electrochemically active region 16 of silver. A layer of electrical insulation 17 is disposed between the metal surfaced base member 12 of electrode lead 11 and second electrode 14. A first electrolyte 19, which is preferably aqueous and immobilized, contacts both electrochemically active regions 13 and 16. An outer sheath 18 of oxygen and carbon dioxide permeable, ion-impermeable diffusion barrier material encapsulates at least electrochemically active regions 13 and 16, and electrolyte 19.

The carbon dioxide sensor is shown in the form of an electrode of an electrochemically active region 19 adhering tightly to an in electrical contact with at least a portion of the metal surfaced base member 12 of the electrode lead 11. Electrochemically active region 20 is palladium oxide. A reference electrode 21 surrounds at least partially and is spaced from the metal surfaced base member of the electrode lead 11. The reference electrode contains a second electrochemically active region 22 of silver and a silver halide. Layer 17 of electrical insulation is disposed between the metal surfaced base member of electrode lead 11 and reference electrode 21. An electrolyte 23, which is preferably aqueous and immobilized, contacts both electrochemically active regions 20 and 21. An outer sheath 18 of oxygen and carbon dioxide permeable, ion-impermeable diffusion barrier material encapsulates at least electrochemically active regions 20 and 22, and electrolyte 23.

The pH electrode is shown in the form of a separate portion of the metal surfaced base member 12 of electrode lead 11 which is exposed exteriorly of outer sheath 18. An electrochemically active region 24 adheres tightly to an is in electrical contact with the exposed portion of the metal surfaced base member. This electrochemically active region is palladium oxide. Region 24 is insulated electrically from regions 13, 16, 20 and 22 by electrical insulation 25 which is shown adhering to the metal surfaced base member 11 between active regions 20 and 24 and covering one portion of region 20.

We found that we could form the above improved carbon dioxide sensor by a method of applying successive elements or layers by immersing or dipping the initial metal surfaced member in various organic solutions after which each solution solvent was evaporated. The application of the successive layers is preferably accomplished by immersion steps but other suitable means include coating, spraying, brushing, etc. The use of immersion steps is described and claimed in the above referenced U.S. Pat. No. 3,798,750.

The miniature probe of our invention can be formed by employing for the initial support wire or electrode lead palladium metal. Three separate and spaced apart electrochemically active regions are applied to the electrode lead to provide the respective sensing element for the oxygen sensor, the carbon dioxide sensor, and the pH electrode. The oxygen sensor has sensing electrode of hydrided palladium with a surface coating of platinum black which is provided on the metal surfaced base member as described in above U.S. Pat. No. 3,714,015. In the event that a metal other than palladium is employed, a layer of palladium must be deposited on at least a portion thereof so that the portion can be hydrided. The other two sensing elements or regions are palladium oxide which are provided on the metal surfaced base member as described in the above U.S. Pat. Nos. 3,705,088 and 3,719,576. These U.S. Pat. Nos. 3,714,015; 3,705,088 and 3,719,576 and the subject matter therein are hereby incorporated by reference.

Various electrical insulating materials are usable and many of such materials can be applied by coating steps. Preferred materials, include Viton hexafluoropropylene-vinylidene fluoride rubber, Alkanex polyester resin lacquer, silicone rubbers, and polypropylene oxides. We prefer to employ Alkanex polyester resin lacquer which provides the desired electrical insulation and which can be applied by coating or dipping. The Alkanex polyester resin lacquer can be cross-linked by heating to insolubilize and thereby facilitate the application of successive layers. We found that various carbon dioxide diffusion barrier materials are suitable as an outer sheath to encapsulate at least the electrochemically active regions and the electrolyte. The carbon dioxide diffusion barrier material must be electrically insulating and have an appropriate permeability coefficient for the carbon dioxide to be sensed. Since these materials are electrically insulating, the carbon dioxide diffusion barrier sheath and the second layer of insulation can be made of one of these materials. Thus, the separate second layer of electrical insulation can be eliminated. Suitable materials which have been employed include silicon-polycarbonate copolymers, Viton hexafluoropropylene-vinylidene fluoride rubber and silicone rubbers.

Our miniature probe can be formed generally by applying successive elements from various organic solutions after which each solution solvent is evaporated. The application of the successive layers is preferably accomplished by a series of immersion or application coating steps.

With reference to the single FIGURE of the drawing, a miniature probe is formed in accordane with our invention by employing a 20 mil palladium wire 11 as the base or electrode lead upon which the successive elements are applied. The wire has its central portion immersed in a solution of Alkanex polyester resin lacquer to apply a first layer of electrical insulation 17 on wire 11. It will be appreciated, of course, that a tube of insulation could be applied over the central portion of the current collector by slipping the tube over the collector. Opposite ends of wire 11 are exposed and not coated by insulation 17. Three spaced apart electrochemically active regions 13, 20 and 24 are formed in electrical contact with wire 11 by roughening three separate and spaced apart portions at one exposed end of the current collector by sand blasting and then applying lightly patinum black by electrocoating on the first portion only. The other two portions are coated with palladium oxide in accordance with the above U.S. Pat. Nos. 3,705,088 and 3,719,576. The opposite exposed end (not shown) is provided for subsequently by applying an electical lead thereto.

For the oxygen sensor, reference electrode 14 is formed of a current collector or electrode lead of silver and is applied to surround wire 11 by painting or plating the silver thereon or using a tube of the metal. Active region 16, which is in contact with one end of the silver, is a silver layer. Oxygen and carbon dioxide diffusion barrier sheath 18 is applied over active region 16. Both active regions 13 and 16 are contacted by a solution of sodium bicarbonate and sodium chloride with a thickening agent thereby forming an electrolyte 19 whereby electrolyte 19 is in contact with both regions 13 and 16. A diffustion barrier of silicone-polycarbonate block copolymer such as described in U.S. Pat. No. 3,189,622 provides outer sheath 18 which encapsulates electrically active regions 13 and 16 and electrolyte 17.

The carbon dioxide sensor is formed in accordance with our invention by employing 20 mil palladium wire 11 as the base or support upon which the successive elements are applied. As described above, the wire has its central portion immersed in a solution of Alkanex polyester resin lacquer to apply first layer of electrical insulation 17 on electrode lead 11. Electrochemically active region 20 is formed in electrical contact with wire 11 and consists of platinum black. Reference electrode 14 is formed of silver or gold and is applied to insulation 17 to surround the wire 11 by painting or plating the silver or the gold thereon. Active region 22 at one end of the gold or silver is silver and silver chloride, which silver chloride is applied by a chloriding step such as anodization in a chloride solution. If gold is employed, silver is deposited electrochemically and then silver chloride is formed on its surface. Electrochemically active regions 20 and 22 are contacted with a solution of sodium bicarbonate and sodium chloride with a thickening agent thereby forming an electrolyte 23. The palladium is charged with hydrogen by using a current of 0.5 to 1.0 milliampere for ten to fifteen minutes employing an auxiliary platinum electrode in the same solution. The device is then rinsed briefly in water and dried in a flowing nitrogen gas for about 1 minute at 50°C. A diffusion barrier of silicone-polycarbonate block copolymer such as described in U.S. Pat. No. 3,189,622 provides outer sheath 18 which encapsulates electrically active regions 20 and 22 and electrolyte 23.

Sheath 18, as described above, is applied to the exterior of the device except that it does not cover active region 24 of palladium oxide which forms the pH electrode. This electrode is exposed exteriorly of outer sheath 18. Separate electrical insultation 25 is provided between regions 20 and 24 to insultate region 24 from region 20. Secondly, insulation 25 insulates regions 20 and 24 from region 13. The pH electrode is used with a separate reference electrode such as a silver-silver halide electrode 26 which surrounds and is insulated electrically from the probe, or which is spaced from the other elements of the probe.

Electrolyte 19 or 23 can be an aqueous solution, an aqueous immobilized soslution, or an anion exchange resin electrolyte. A suitable aqueous electrolyte is 0.01 molar bicarbonate and 1.0 molar sodium chloride. The aqueous electrolyte can be immobilized, for example, with a conventional thickening or gelling agent. Such aqueous electrolytes and applications are described in above-mentioned U.S. Pat. No. 3,719,576. A suitable anion exchange resin electrolyte is quaternized polystyrene partially in its chloride form. Anion exchange resin electrolytes, preparations therefor, and applications are described in above-mentioned U.S. Pat. No. 3,705,088. Both of these U.S. Pat. Nos. 3,705,088 and 3,719,576 and the subject matter therein are hereby incorporated by reference.

The resulting device is a miniature probe containing multifunctional electrochemical sensing elements. The oxygen sensor, the carbon dioxide sensor, and the pH electrode of the miniature probe with a reference electrode can be used for clinical and other analysis. A high impedance voltmeter is connected to the various electrodes of the probe and to a separate reference electrode. In this manner, the current can be read across the electrodes containing active regions 13 and 16 which current is a function of the oxygen. The terminal voltage can be read across the electrodes containing the active regions 20 and 22. This terminal voltage from the sensor in operation will be a function of the carbon dioxide partial pressure in equilibrium with it. The terminal voltage can also be read separately across the electrode containing active region 24 and a separate reference electrode. This terminal voltage from the sensor in operation will be a function of the pH.

Examples of miniature probes made in accordance with our invention are as follows:

EXAMPLE 1

A miniature probe sensor is formed in accordance with the above description and as generally shown in the single figure of the drawing. The metal surfaced base member is in the form of a 30 mil palladium wire, one end of which has been coated with three separate and spaced apart electrochemically active regions of hydrided palladium with a surface coating of platinum black, palladium oxide and palladium oxide, respectively, thereby forming three separate electrodes. The remainder of the metal surfaced base member, with the exception of about 1 centimeter at the opposite end, is coated with Alakanex polester resin lacquer. This is accomplished by contacting it with a solution of Alkanex polyester resin lacquer. The coated wire is heated at a temperature of 100°C to evaporate the solvent and then to 200°C to cross-link the coating. This coating step is repeated several times. The metal lead for both reference electrodes is silver which was applied as a lacquer over the first insulation. The lacquer employs Alkanex polyester resin lacquer as the binder for silver flake. Application is accomplished as above for the first insulation. Only one coat is applied. For the carbon dioxide sensor, a 0.5 cm. wide band at the end of the silver coating adjacent to the first palladium oxide region is chlorided anodically at a current of 0.5 milliamperes using 0.1 NHCl bath with a platinum electrode serving as the counter electrode. The sequence of the chloriding is 2 minutes anodic, 2 minutes cathodic and 10 minutes anodic. An aqueous immobilized electrolyte of 0.01 molar sodium bicarbonate and 1.0 molar sodium chloride is applied to the first and second electrodes and to the carbon dioxide reference electrode. A layer of silver is applied to the first electrolyte. A second layer of electrical insulation is then applied over the probe excluding the silver chloride portion of the second reference electrode and over the electrolyte excluding the second palladium oxide region of the pH electrode by contacting the structure wire with a solution of silicone-polycarbonate resin in chloroform. The cloroform is removed by heating for 5 to 10 minutes in a nitrogen atmosphere at 502 C. The resulting polymer film is both a diffusion barrier and has electrical insulating properties. Thus, in addition to an outer sheath of an insulating layer being formed over the probe an oxygen and cabron dioxide permeable, ion-impermeable diffusion barrier also encapsulates the electrically active regions and the electrolytes. The resulting structure is a miniature probe made in accordance with our invention.

EXAMPLE 2

A miniature probe sensor is formed in accordance with the above description and as generally shown in the single figure of the drawing. Each electrolyte is an ion exchange resin electrolyte consisting of a quaternized polystyrene in the chloride form having an ion exchange capacity of about 1.4 milli-equivalents per gram. The electrolyte layer is applied by contacting the structure with a solution of the resin in a mixture of chloroform-methanol to contact the electrochemically active regions. The structure is then heated in nitrogen at 50°C for 10 minutes to eliminate any residual solvents. The electrolytes are each converted to a partially bicarbonate form and partially chloride form by immersing the structure in an aqueous 0.1 M KCl–0.1 M $KHCO_3$ solution for about an hour. The structure is then rinsed briefly in water and dried for about 1 minute in flowing nitrogen gas at 50°C. The miniature probe is completed otherwise as described above in Example 1.

While other modifications of the invention and variations thereof which may be embraced within the scope of the invention have not been described, the invention is intended to include such as may be embraced within the following claims.

What we claim as new and desire to secure by Letters Patent of the United States is:

1. A miniature probe containing an oxygen sensor, a carbon dioxide sensor and a pH electrode which comprises a flexible, elongated electrode lead, the electrode lead comprising a base member, and an exterior surface of palladium on the base member, three separate and spaced apart electrochemically active regions of hydrided palladium with a surface of platinum black, palladium oxide and palladium oxide, respectively, adhering tightly to an in electrical contact with the metal surfaced base member of the electrode lead and insulated electrically from each other thereby forming an oxygen electrode, a hydrogen electrode and a hydrogen electrode, respectively, a reference electrode for the oxygen electrode surrounding at least partially and spaced from the metal surfaced base member of the electrode lead, the reference electrode containing a metal lead and an electrochemically active region of silver, a layer of electrical insulation disposed between the metal surfaced base member of the electrode lead and the metal lead of the reference electrode, and electrolyte contacting both the electrochemically active regions of hydrided palladium with a surface of platinum black, and silver, and an outer sheath of oxygen permeable, ion-impermeable diffusion barrier material encapsulating at least the electrochemically active regions and the electrolyte thereby providing an oxygen sensor; a reference electrode for the first hydrogen electrode surrounding at least partially and spaced from the metal surfaced base member of the electrode lead, the reference electrode containing an electrochemically active region of silver and a silver halide, a layer of electrical insulation disposed between the metal surface base member of the electrode lead and the reference electrode, and electrolyte contacting both the electrochemically active regions of palladium oxide and silver and silver halide, and an outer sheath of carbon dioxide permeable, ion-impermeable diffustion barrier material encapsulating at least the electrochemically active regions and the electrolyte thereby providing a carbon dioxide sensor; and a pH electrode comprising a separate portion of the metal surfaced base member of the electrode lead and an electrochemically active region of palladium oxide adhering tightly to and in electrical contact with the metal surfaced base member and exposed exteriorly of the outer sheaths.

2. In a miniature probe as in claim 1, in which there is a continuous outer sheath of oxygen and carbon dioxide permeable, ion-impermeable diffusion barier material.

3. In a miniature probe as in claim 1, in which both electrolytes are immobilized aqueous solutions.

4. In a miniature probe as in claim 1, in which both electrolytes are anion exchange resin material of quaternized polystyrene partially in its bicarbonate form and partially in its chloride form.

5. An analytical apparatus comprising the miniature probe of claim 1 and a separate reference electrode connected electrically to the pH electrode of the probe.

6. An analytical apparatus as in claim 5 in which the separate reference electrode surrounds and is insulated electrically from the probe.

7. An analytical apparatus as in claim 5 in which the separate reference electrode is spaced from the other elements of the probe.

* * * * *